United States Patent
Sastry et al.

(10) Patent No.: US 10,726,162 B2
(45) Date of Patent: Jul. 28, 2020

(54) SECURITY PLUGIN FOR A SYSTEM-ON-A-CHIP PLATFORM

(71) Applicant: Intel Corporation, Santa Clara, CA (US)

(72) Inventors: Manoj R Sastry, Portland, OR (US); Alpa Narendra Trivedi, Hillsboro, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/577,812

(22) Filed: Dec. 19, 2014

(65) Prior Publication Data

US 2016/0180114 A1    Jun. 23, 2016

(51) Int. Cl.
| | | |
|---|---|---|
| *G06F 21/72* | (2013.01) | |
| *G09C 1/00* | (2006.01) | |
| *G06F 21/85* | (2013.01) | |
| *H04L 9/06* | (2006.01) | |
| *H04L 9/08* | (2006.01) | |

(52) U.S. Cl.
CPC .............. *G06F 21/72* (2013.01); *G06F 21/85* (2013.01); *G09C 1/00* (2013.01); *H04L 9/0643* (2013.01); *H04L 9/0897* (2013.01); *G06F 2207/7219* (2013.01); *G06F 2211/008* (2013.01); *G06F 2213/0038* (2013.01); *H04L 2209/76* (2013.01)

(58) Field of Classification Search
CPC .............. G06F 21/72; G06F 2211/008; G06F 2207/7219; G06F 21/85; H04L 9/0897; H04L 9/0643
See application file for complete search history.

(56) References Cited

U.S. PATENT DOCUMENTS

| | | | | |
|---|---|---|---|---|
| 5,559,889 A | * | 9/1996 | Easter | ............ G06F 21/72 380/30 |
| 5,563,950 A | * | 10/1996 | Easter | ............ G06F 21/72 713/172 |
| 6,209,098 B1 | * | 3/2001 | Davis | ............ G06F 12/1408 713/194 |

(Continued)

FOREIGN PATENT DOCUMENTS

| | | |
|---|---|---|
| CN | 107004097 A | 8/2017 |
| EP | 3235166 B1 | 2/2019 |
| WO | WO-2016100012 A1 | 6/2016 |

OTHER PUBLICATIONS

NPL Search (InnovationQ) (Year: 2020).*

(Continued)

*Primary Examiner* — Mahfuzur Rahman
*Assistant Examiner* — Richard W Cruz-Franqui
(74) *Attorney, Agent, or Firm* — Schwegman Lundberg & Woessner, P.A.

(57) ABSTRACT

Systems and techniques for a System-on-a-Chip (SoC) security plugin are described herein. A component message may be received at an interconnect endpoint from an SoC component. The interconnect endpoint may pass the component message to a security component via a security interlink. The security component may secure the component message, using a cryptographic engine, to create a secured message. The secured message is delivered back to the interconnect endpoint via the security interlink and transmitted across the interconnect by the interconnect endpoint.

24 Claims, 5 Drawing Sheets

(56) References Cited

U.S. PATENT DOCUMENTS

| | | | | |
|---|---|---|---|---|
| 6,295,604 B1* | 9/2001 | Callum | ............... | G06F 21/602 |
| | | | | 713/160 |
| 6,389,537 B1* | 5/2002 | Davis | ................ | G06F 21/10 |
| | | | | 713/187 |
| 7,100,133 B1* | 8/2006 | Meiyappan | ........... | G06F 30/33 |
| | | | | 716/102 |
| 7,140,005 B2 | 11/2006 | Maliszewski | ...... | G06F 11/3688 |
| | | | | 717/126 |
| 7,340,672 B2* | 3/2008 | Goldschmidt | ....... | H03M 13/11 |
| | | | | 714/800 |
| 7,620,743 B2* | 11/2009 | Gehman | ............... | G06F 8/36 |
| | | | | 710/17 |
| 7,636,858 B2* | 12/2009 | Khan | .................... | H04L 9/32 |
| | | | | 713/172 |
| 7,778,166 B2* | 8/2010 | Dewan | ................. | H04L 47/10 |
| | | | | 370/229 |
| 7,987,356 B2* | 7/2011 | Buer | ................... | G06F 21/606 |
| | | | | 713/155 |
| 8,281,122 B2* | 10/2012 | Durham | ............. | H04L 9/0827 |
| | | | | 713/150 |
| 8,316,258 B2* | 11/2012 | Hughes | ............. | G06F 11/1076 |
| | | | | 714/2 |
| 8,438,658 B2* | 5/2013 | Hofstee | ................ | G06F 21/57 |
| | | | | 705/50 |
| 8,516,602 B2* | 8/2013 | Vepsalainen | ......... | G06F 21/33 |
| | | | | 713/150 |
| 8,560,863 B2* | 10/2013 | Munguia | ........... | G06F 12/1408 |
| | | | | 380/264 |
| 8,631,247 B2* | 1/2014 | O'Loughlin | .......... | G06F 21/57 |
| | | | | 713/189 |
| 8,683,215 B2* | 3/2014 | Buer | ................... | G06F 21/606 |
| | | | | 713/187 |
| 8,711,161 B1* | 4/2014 | Scotzniovsky | ........................ |
| | | | | G01R 31/318544 |
| | | | | 345/531 |
| 8,768,642 B2* | 7/2014 | Diamond | ....... | G01R 31/318544 |
| | | | | 700/1 |
| 8,799,673 B2* | 8/2014 | Savagaonkar | ...... | G06F 12/1441 |
| | | | | 713/189 |
| 8,873,746 B2* | 10/2014 | Long | ................. | H04L 63/0428 |
| | | | | 380/44 |
| 8,885,825 B2* | 11/2014 | Carles | ................ | H04L 63/061 |
| | | | | 380/255 |
| 9,015,484 B2* | 4/2015 | Kolar Sundar | ........ | H04L 9/083 |
| | | | | 713/168 |
| 9,043,615 B2* | 5/2015 | Fullerton | ............... | G06F 21/57 |
| | | | | 713/193 |
| 9,092,644 B2* | 7/2015 | Narendra Trivedi | ....................... |
| | | | | H04L 9/0643 |
| 9,094,733 B2* | 7/2015 | Grewal | ............... | H04N 21/266 |
| 9,124,421 B2* | 9/2015 | Zhao | ................... | H04L 67/12 |
| 9,165,143 B1* | 10/2015 | Sanders | ............... | G06F 21/575 |
| 9,183,158 B2* | 11/2015 | O'Loughlin | ........ | G06F 12/1408 |
| 2002/0104004 A1* | 8/2002 | Couillard | .................. | G06F 1/14 |
| | | | | 713/178 |
| 2002/0188910 A1* | 12/2002 | Zizzo | ..................... | G06F 30/30 |
| | | | | 716/103 |
| 2006/0059574 A1* | 3/2006 | Fayad | .................... | G06F 21/76 |
| | | | | 726/34 |
| 2006/0224883 A1* | 10/2006 | Khosravi | ............. | H04L 63/166 |
| | | | | 713/151 |
| 2008/0320263 A1* | 12/2008 | Nemiroff | ............ | G06F 21/6209 |
| | | | | 711/164 |
| 2010/0278338 A1 | 11/2010 | Chang et al. | | |
| 2014/0082237 A1* | 3/2014 | Wertheimer | ........ | G06F 13/4022 |
| | | | | 710/104 |
| 2014/0108818 A1* | 4/2014 | Choi | ....................... | G06F 21/57 |
| | | | | 713/189 |
| 2014/0108825 A1 | 4/2014 | O'loughlin et al. | | |
| 2014/0137231 A1* | 5/2014 | Sastry | ................... | G06F 13/385 |
| | | | | 726/16 |
| 2014/0173249 A1 | 6/2014 | Fox et al. | | |
| 2014/0181531 A1 | 6/2014 | Saha et al. | | |
| 2015/0046702 A1* | 2/2015 | Paaske | ..................... | G09C 1/00 |
| | | | | 713/160 |
| 2015/0082420 A1* | 3/2015 | Love | ................... | G06F 21/6218 |
| | | | | 726/16 |
| 2015/0188702 A1* | 7/2015 | Men | ...................... | H04L 9/0866 |
| | | | | 713/153 |
| 2015/0244685 A1* | 8/2015 | Shah | ..................... | G06F 21/602 |
| | | | | 713/155 |
| 2015/0371055 A1* | 12/2015 | Park | .................... | G06F 21/6218 |
| | | | | 713/165 |

OTHER PUBLICATIONS

"International Application Serial No. PCT/US2015/064485, International Search Report dated Apr. 5, 2016", 3 pgs.

"International Application Serial No. PCT/US2015/064485, Written Opinion dated Apr. 5, 2016", 6 pgs.

"European Application Serial No. 15870706.7, Extended European Search Report dated May 29, 2018", 9 pgs.

"European Application Serial No. 15870706.7, Response filed Jul. 4, 2018 to Extended European Search Report dated May 29, 2018", 27 pgs.

"Transport Layer Security—Wikipedia", [Online] Retrieved from the Internet : <https:en.wikipedia.org/w/index.php?title=Transport_Layer_Security&oldid=616952496>, (Jul. 14, 2014), 1-27.

Haixin, Wang, et al., "A Gbps IPSec SSL Security Processor Design and Implementation in an FPGA Prototyping Platform", Journal of Signal Processing Systems ; for Signal, Image, and Video Technology (Formerly the Journal of VLSI Signal Processing Systems for Signal, Image, and Video Technology), Springer US, Boston, vol. 58, No. 3, (May 12, 2009), 311-324.

Verschoor, Martijn, "Design of a Crypto Core for Securing Intra System-on-Chip Communication", [Online] Retrieved from the Internet : <https://pdfs.semanticscholar.org/2274/dcf228e29a247f69130af600b52c70bc309c.pdf>, (Mar. 4, 2011), 64 pgs.

"Chinese Application Serial No. 201580063003.2, Office Action dated May 11, 2020", w/ English Translation, 10 pgs.

"Chinese Application Serial No. 201580063003.2, Response dated Mar. 9, 2020 to Office Action dated Oct. 23, 2019", w/ English Claims, 15 pgs.

\* cited by examiner

SECURITY PLUGIN FOR A SYSTEM-ON-A-CHIP PLATFORM

TECHNICAL FIELD

Embodiments described herein generally relate to a system-on-a-chip (SoC) interconnect and more specifically to a security plugin for an SoC platform.

BACKGROUND

An SoC is an integrated circuit (IC) that includes a number of computer components on a single chip substrate. An SoC may include any number of component blocks (e.g., intellectual property blocks or IP blocks), referred to herein as SoC components, that perform a function, such as graphics processing, memory management, general or special purpose processing, etc. The SoC may also include a fabric to connect the various SoC components with each other (e.g., intra-chip communication) or with components external to the SoC (e.g., inter-chip communications) via an interconnect (e.g., bus). Interconnect endpoints may interface the SoC components to the interconnect, for example, by packing SoC component data into interconnect messages for transmission on the interconnect and unpacking interconnect messages for transmission to the SoC components.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

With the emerging dominance of the SoC's in the market, SoC platforms are becoming sophisticated and comprehensive platforms comprising a large number of SoC components ranging from video/audio/image processing, to myriad number of sensors, to the low-level general purpose processors and input-output interfaces. Fixed-function and programmable SoC components enable manufacturers to provide differentiation in the marketplace.

SoC components may be designed for use in multiple platforms and implemented before a specific platform's security requirements have been defined. This design cycle may make it challenging for SoC component designers to determine the features to incorporate in a given SoC component to address security requirements of the target platform. As platform assets (keys, configuration value, etc.) are transported across the fabrics/interconnects from IP block to another, integrity and confidentiality of data become critical. Example security requirements for the target platform may include addressing intra-chip attacks—e.g., message sniffing or modification on the interconnect between two SoC components using, for example, debugging hardware or software—or addressing inter-chip attacks—e.g., sniffing or modifying messages between an SoC component on a first SoC and an SoC component on a second SoC via an inter-chip interconnect.

Meanwhile, SoC convergence through definition of a common fabric, including a component interconnect, is driving reuse and quick integration of SoC components across a variety of SoC platforms ranging from phones/tablets/micro-servers to clients/server platforms. Consequently, the following example issues have been identified:

SoC platform (e.g. 14 nm transistor process) requires a specific SoC component, which has a crypto circuit that is built on an older generation of process technology (e.g. 45 nm transistor process). This results in a less optimized platform.

SoC components developed from different groups may have inconsistent security implementations as some use more optimized circuits with a sound security practice and others end up with ad-hoc/customized crypto design.

Given the diversity of SoC fabrics, integrating the SoC components requires wrappers and bridges to be developed which adds to the die-area and requires additional implementation and validation resources.

Integrating crypto/security for the SoC component based on the security requirements of the target platform becomes an onerous task.

As a result, implementation of security features faces an uphill battle in terms of the schedule impact and may not make it in time to market the product. To address these issues, a modular and scalable micro-architecture security plugin (e.g., security component or security block) may be used as an SoC component with a variety of cryptographic engines available via a standard interface to the SoC interconnect fabric. As used herein, the security plugin is a hardware implemented functional block in a SoC platform. By using a standard interface, different cryptographic engines may be selected to meet security and manufacturing goals without redesign of other SoC components. For example, SoC designers may have a choice of four or five different Advanced Encryption Standard (AES) SoC component implementations. Without the security plugin, each implementation may have different interfaces that the SoC integration team must accommodate to integrate any one implementation. This may represent challenges for their time to market. However, using the described cryptographic engine, the SoC integrators may select any of the implementations without redesigning the connections of other SoC components. Thus the SoC integration team does not need to waste time on the internals of a security circuit or the bus interface between security circuit and a controller. Instead, they could select a suitable policy based on their security and manufacturing goals—such as an encryption through-put, power consumption, die size, cost, etc.—and instantiate the security plugin that meets those goals without additional design. Further, by integrating the plugin at SoC interconnected endpoints, individual SoC components need not be concerned with security as all communications will benefit from the security offered by the described plugin. Additional details are provided below.

Figure 1:
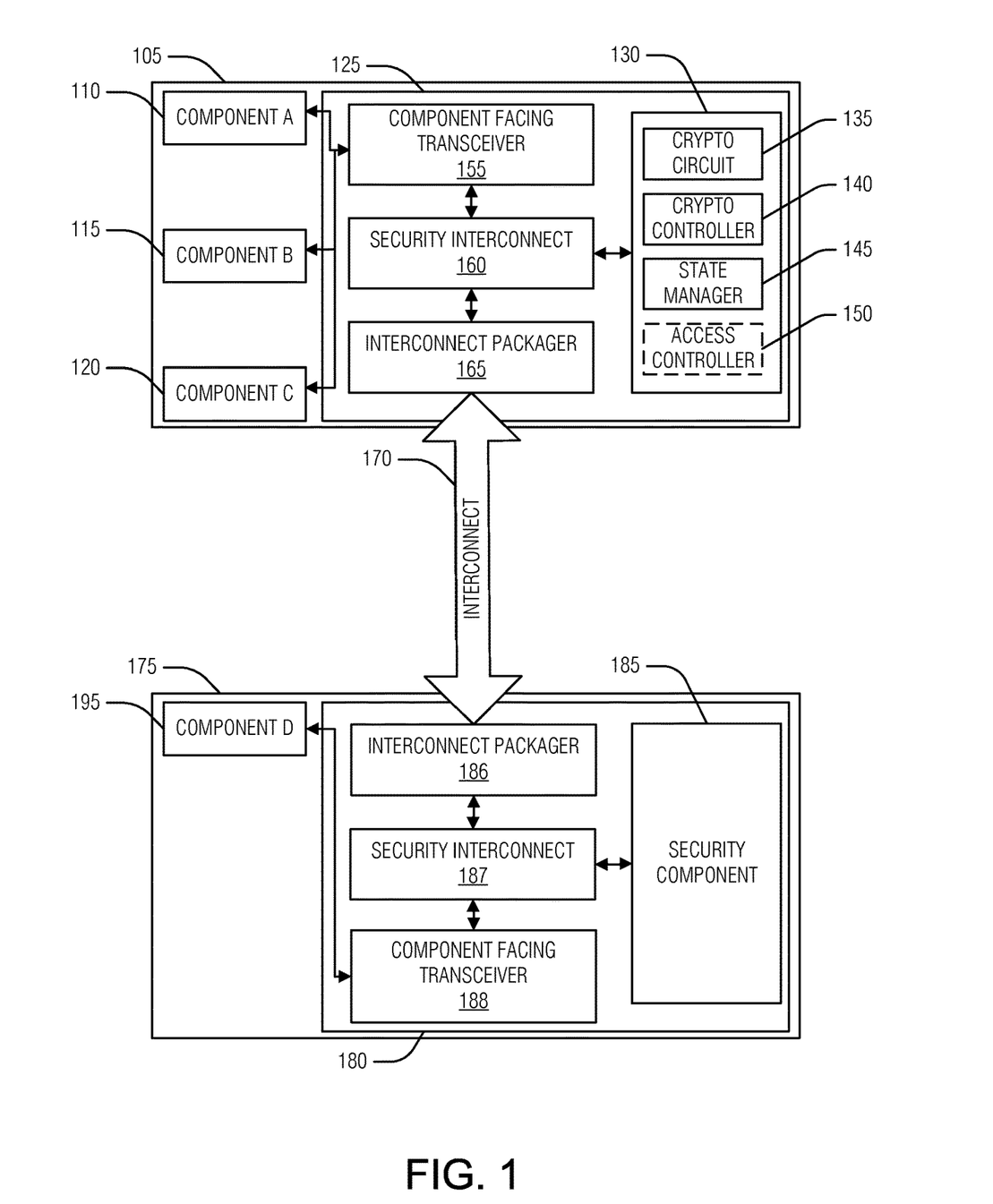
FIG. 1 is a block diagram of an example of a system for a security plugin for an SoC platform, according to an embodiment.

FIG. 1 is a block diagram of an example of a system 100 for a security plugin for an SoC platform, according to an embodiment. The system 100 may include a first SoC die 105 and a second SoC die 175 connected via an interconnect 170. The first SoC die 105 may include a plurality of SoC components (e.g., component A 110, component B 115, and component C 120) communicatively coupled any one or more of each other or off-die components (e.g., component D 195 of the second SoC die) via an interconnect endpoint 125. The interconnect endpoint 125 may include a security component 130, a component facing transceiver 155, a security interconnect 160, and a interconnect packager 165. Similar to the first SoC die 105, the second SoC die 175 may include one or more SoC components (e.g., component D 195) and interconnect endpoint 180. Similar to the interconnect endpoint 125, the interconnect endpoint 180 may include a security component 185, an interconnect packager 186, a security interconnect 187, and a component facing transceiver 188. In an example, the components of the interconnect endpoint 180 and the security component 185 respectively mirror those of the interconnect endpoint 125 and security component 130.

The component facing transceiver 155 may be arranged (e.g., configured, designed, manufactured, structured, etc.) to send or receive component messages to components (e.g., e.g., component A 110, component B 115, component C 120, or component D 195). As used herein, component messages are communications between individual SoC components and the interconnect endpoint 125, such as a register read or write (e.g., to a memory-mapped input-output register) or a direct memory access (DMA) message.

The security interconnect 160 may be arranged to connect the messaging pipeline of the component facing transceiver 155 and the interconnect packager 165 to the security component 130. The security interconnect 160 may conform to a standard interface of the security component 130. During operation, a component message received from the component facing transceiver 155 or from the interconnect 170 at the interconnect packager 165 may be passed to the security component 130 to respectively encrypt or decrypt the message before continuing on to its destination. In an example, an interconnect message header analyzer may be present in the security component 130, the security interconnect 160, or elsewhere in the interconnect endpoint 125 to read an interconnect message header and determine if it is an encrypted message and cause the security component 130 to decrypt or authenticate the message if it is an encrypted message.

The interconnect packager 165 may be arranged to convert a component message into an interconnect message and vice versa. As used herein, an interconnect message is structured so as to conform to a messaging standard of the interconnect 170. Example interconnect messages are illustrated in FIGS. 3-6, including a basic interconnect message at FIG. 3.

The security component 130 may include a cryptographic circuit 135, a cryptographic controller 140, and a state manager 145. In an example, the security component may include an access controller 150. The cryptographic circuit 135 may include a cryptographic engine selected from a plurality of cryptographic engines. For example, a library of SoC component cryptographic engines may be available to SoC designers. During SoC design, the designers may have one or more security or manufacturing goals. A policy may embody these goals and be applied to the characteristics of the cryptographic engines to select an appropriate engine. Example goals may include cost, die size, power consumption, data throughput, cryptographic strength, etc. For example, a variety of cryptographic engines may implement AES. AES implementations may conform to bandwidth requirements, such as greater than ten gigabits per second (Gbps) for high performing implementation that will generally use a large die size or draw significant power, greater than 100 megabits per second (Mbps) for medium performing implementation which may have a smaller die size or consume less power than the high performing implementation, and about one Mbps for a small (e.g., about 10,000 gates) die size implementation. Thus, if SoC specification calls for an encryption bandwidth of one Gbps, an implementation matching that throughput may be instantiated by the SoC integrators with a medium performing AES block.

The library of cryptographic engines may also include engines that perform other security operations, such as hash functions, integrity engines (e.g., message authentication code (MAC) engine), or public key operations (Rivest-Shamir-Adleman cryptosystem (RSA), elliptic curve cryptography (ECC), etc.). In an example, the cryptographic circuit 135 may include an integrity engine selected from a plurality of integrity engines and the standard interface is generic to the plurality of the integrity engines. Thus, the standard interface operates to connect the messaging pipeline of the interconnect endpoint 125 to one or both of the cryptographic engine and the integrity engine. In an example, the plurality of cryptographic engines or the integrity engines may be classified by at least one of die size, power consumption, cost, throughput performance (e.g., bits per second), cryptographic performance (e.g., level of difficulty to break), manufacturing considerations (e.g., different feature sizes), etc. These classifications may be used to select the cryptographic engine or the integrity engine to meet design goals of the SoC designers.

The cryptographic circuit may also include a standard interface that is generic to the plurality of cryptographic engines. The standard interface may be bi-directional between the cryptographic engine and a requester (e.g., the security interconnect 160. Being generic to the variety of possible cryptographic engines allows SoC designers to select a particular cryptographic engine at nearly any time during the SoC design because additional connection interfaces, wrappers, etc., are not necessary to use the cryptographic engine. In an example, the standard interface is a messaging bus in which requests to specific cryptographic engines are transmitted and translated into a specific hardware interface of the cryptographic engine.

The cryptographic controller 140 may be arranged to manage a cryptographic key used by the cryptographic engine. In an example a seed (e.g., initialization) key may be designated to the cryptographic controller 140 when it is manufactured. In an example, during operation of the SoC, the cryptographic controller 140 may be arranged to perform key negotiation with other endpoint components (e.g., the security component 185) to, for example, obtain a session key. In an example, cryptographic keys, including session keys, may be obtained from field programmable devices, such as infield-programmable fuses, read only memories, etc. In an example, session keys are different between different cryptographic sessions. The cryptographic controller 140 provides the cryptographic keys to the cryptographic circuit and communicates with the cryptographic state manager 145 to maintain communication session state.

The cryptographic state manager may be arranged to manage cryptographic session states between an initiator component (e.g., component A 110 and a destination (e.g., responder) component. In an example, the cryptographic state manager 145 may maintain a table to manage cryptographic session states. In an example, the table may include a destination SoC component identifier, sequence number, and session key fields for each cryptographic session. Using the example above of different session keys for different sessions, transactions to different SoC components may use different session keys. Thus, compromising a transaction to component D 195 will not compromise a transaction to component B 115. The sequence number may be used to thwart replay attacks to prevent prior session data from being used to modify the current state of the session. In an example, one or both of the session key and the sequence number are indexed by the destination SoC component identifier.

The access controller 150 may be arranged to manage access rights of SoC components. The access controller 150 may include a security-attributes-of-the-initiators registry arranged to store access rights of the SoC components. The access controller 150 may also include a filter to block a message (e.g., either a component message or an interconnect message) in response to determining that an initiator component of the message does not have access (e.g., to send a message) to a destination component based on the security-attributes-of-the-initiators registry. In an example, the access controller 150 may access a security attribute index in the message header to determine whether or not to allow a message transaction.

By using the security component 130 as detailed above, all inter and intra SoC component communications may be secured without redesigning SoC components. Thus, the system 100 operates differently than, for example, antipiracy hardware component encryption (e.g., encryption from graphics processor to display driver) which requires SoC component level compliance. The system 100 provides a more secure environment because every communication is secured using a cryptographic implementation that is independent of individual SoC components. Moreover, the flexible nature of the cryptographic engine implementation allows for a flexible architecture that meets security and manufacturing goals.

Figure 2:
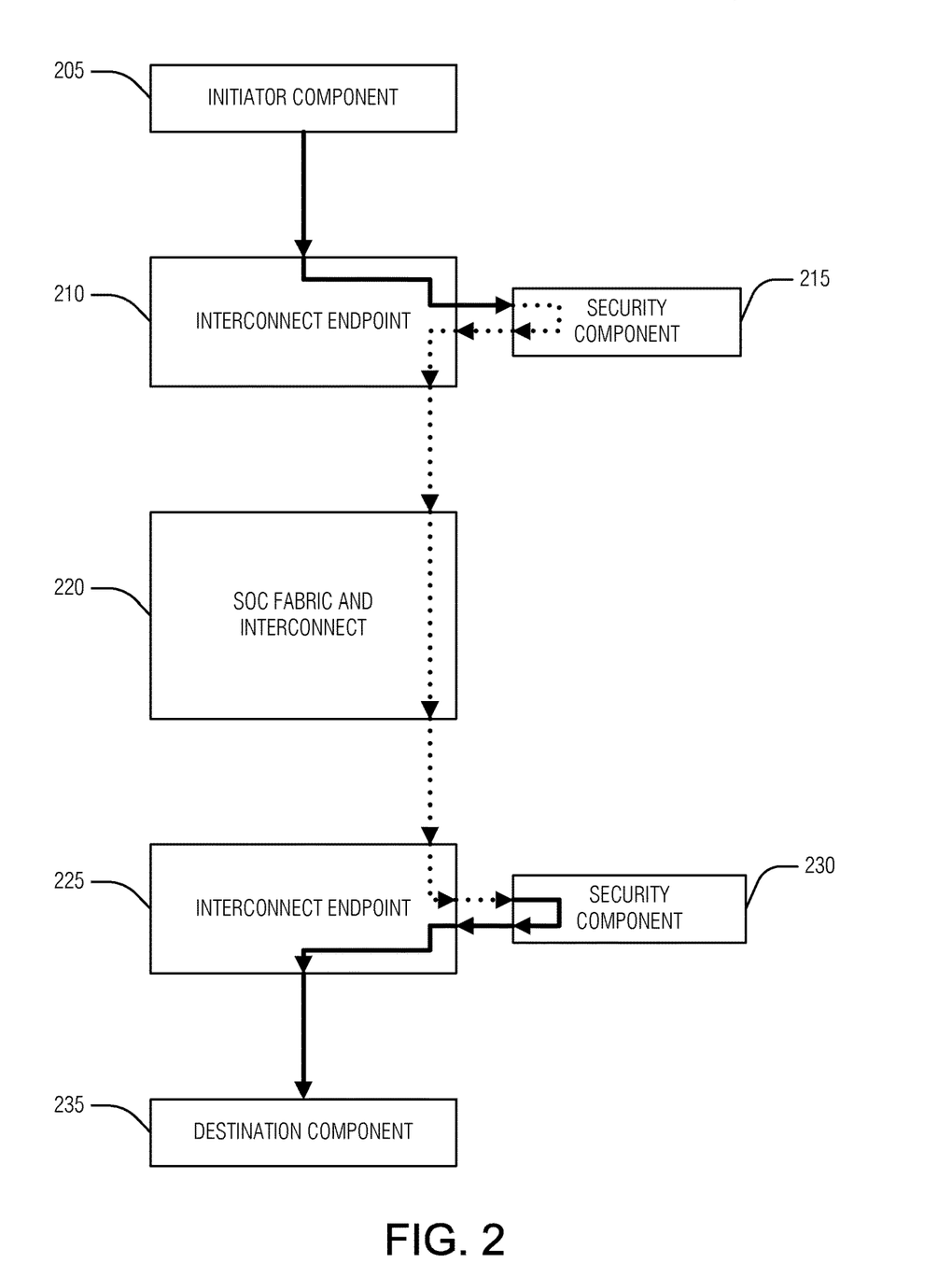
FIG. 2 illustrates an example of a data flow in a system for a security plugin for an SoC platform, according to an embodiment.

FIG. 2 illustrates an example of a data flow in a system 200 for a security plugin for an SoC platform, according to an embodiment. The components of the system 200 may be implemented by the components discussed above with respect to FIG. 1. The system 200 may include an initiator component 205, an interconnect endpoint 210 with a security component 215, an SoC fabric including an interconnect 220, another interconnect endpoint 225 with security component 230, and a destination component 235. The solid arrows denote the message flow within the boundary of an interconnect endpoint and an SoC component. This link is uniquely owned by the SoC component and generally does not benefit from cryptographic protections. The dotted lines denote a secured message flow (e.g., encrypted or secured against tampering message) as the represented links are not controlled by the given SoC component.

As illustrated, the initiator component 205 transmits a message to the interconnect endpoint 210 that services the initiator component. The interconnect endpoint 205 may pass the message to its security component 215 to secure the message, creating a secured message. The secured message may be returned to the interconnect endpoint to be wrapped into an interconnect message. The interconnect message may be transmitted, via the interconnect 220, to the interconnect endpoint 225. The interconnect endpoint 225 reads a header of the interconnect message and determines that it is a secured message. In response to this determination, the interconnect endpoint 225 forwards the secured portions of the interconnect message to its security component 230. In an example, the security component 230 may negotiate with the security component 215 to obtain the session key for this transaction at this time. However, in an example, the session key negotiation may occur at any time between the receipt of the request to secure the component message by the security component 215 and the session key negotiation may be initiated by the security component 215.

In an example, the interconnect endpoint 210 and 225 are on the same SoC die (e.g., performing intra-chip communications). In an example, the interconnect endpoint 210 and 225 are not on the same SoC die (e.g., performing inter-chip communications). By securing the SoC component communications as illustrated in FIG. 2, malicious actors may be thwarted by denying them access to the messages as they move on the SoC interconnect 220. Further, any SoC components may be used without regard to which or a plurality of security configurations were selected by the SoC designers.

FIGS. 3-6 illustrate examples of interconnect messages in a system for a security plugin for an SoC platform, according various embodiments.

Figure 3:
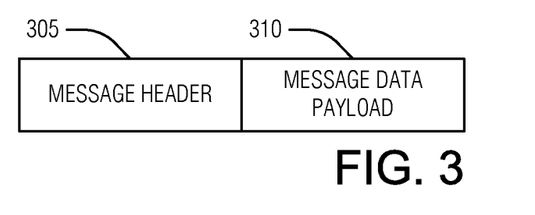
FIGS. 3-6 illustrate examples of interconnect messages in a system for a security plugin for an SoC platform, according to an embodiment.

FIG. 3 illustrates the constituents of a basic (e.g., unsecured) interconnect message, according to an embodiment. The basic interconnect message may include a message header 305 and a message data payload 310. In this example, the message header 305 is specific to a protocol of the interconnect. Further, the message data payload 310 may be the entire component message or a portion of the component message (e.g., the data to be written to a register whereas the register address may be placed in the message header 305).

Figure 4:
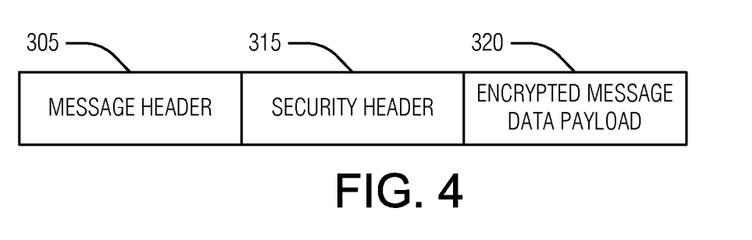

FIG. 4 illustrates the constituents of an encrypted message, according to an embodiment. The encrypted message may be created after all or a portion of the component message are encrypted by a cryptographic engine, such as those described above with respect to FIG. 1, to create the encrypted message data payload 320. The encrypted message may also include a security header 315 provided, for example, by the cryptographic controller or cryptographic circuit. The security header 315 at least identifies the message as an encrypted message to a recipient interconnect endpoint. Further, in an example, the security header 315 may include identification information to permit a recipient security component to decrypt the encrypted message data payload. For example, the security header 315 may identify the initiating security component to the destination security component to permit a session key negotiation between the two. The encrypted message may also include the message header 305 to permit the interconnect to deliver the message without requiring any concern for the encrypted nature of the message.

Figure 5:
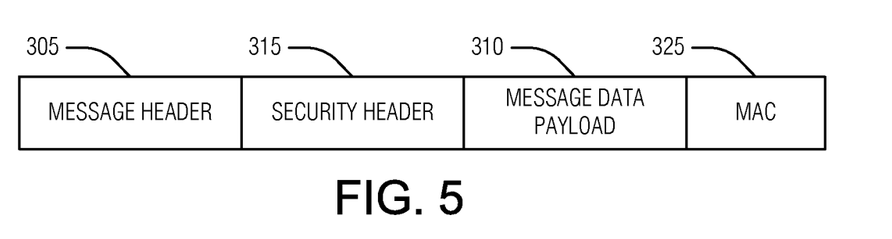

FIG. 5 illustrates the constituents of an integrity-protected message, according to an embodiment. The integrity-protected message may include a message header 305 and message data payload 310 (unencrypted) just like the basic interconnect message. Additionally, the integrity-protected message may include an integrity component 325 (e.g., MAC, cryptographic hash, etc.) and a security header 315.

Figure 6:
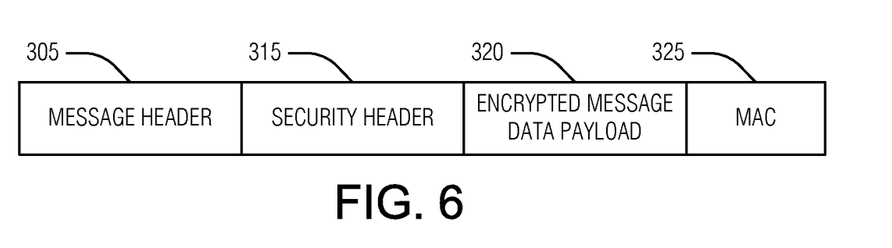

FIG. 6 illustrates the constituents of an encrypted and integrity-protected message, according to an embodiment. The encrypted and integrity-protected message provides both secrecy and tamper protection to the component message data. The encrypted and integrity-protected message may include the message header 305 as found in all of the interconnect messages. Additionally, the encrypted and integrity-protected message may include a security header 315, an encrypted message data payload 320, and an integrity component 325 as described above.

Figure 7:
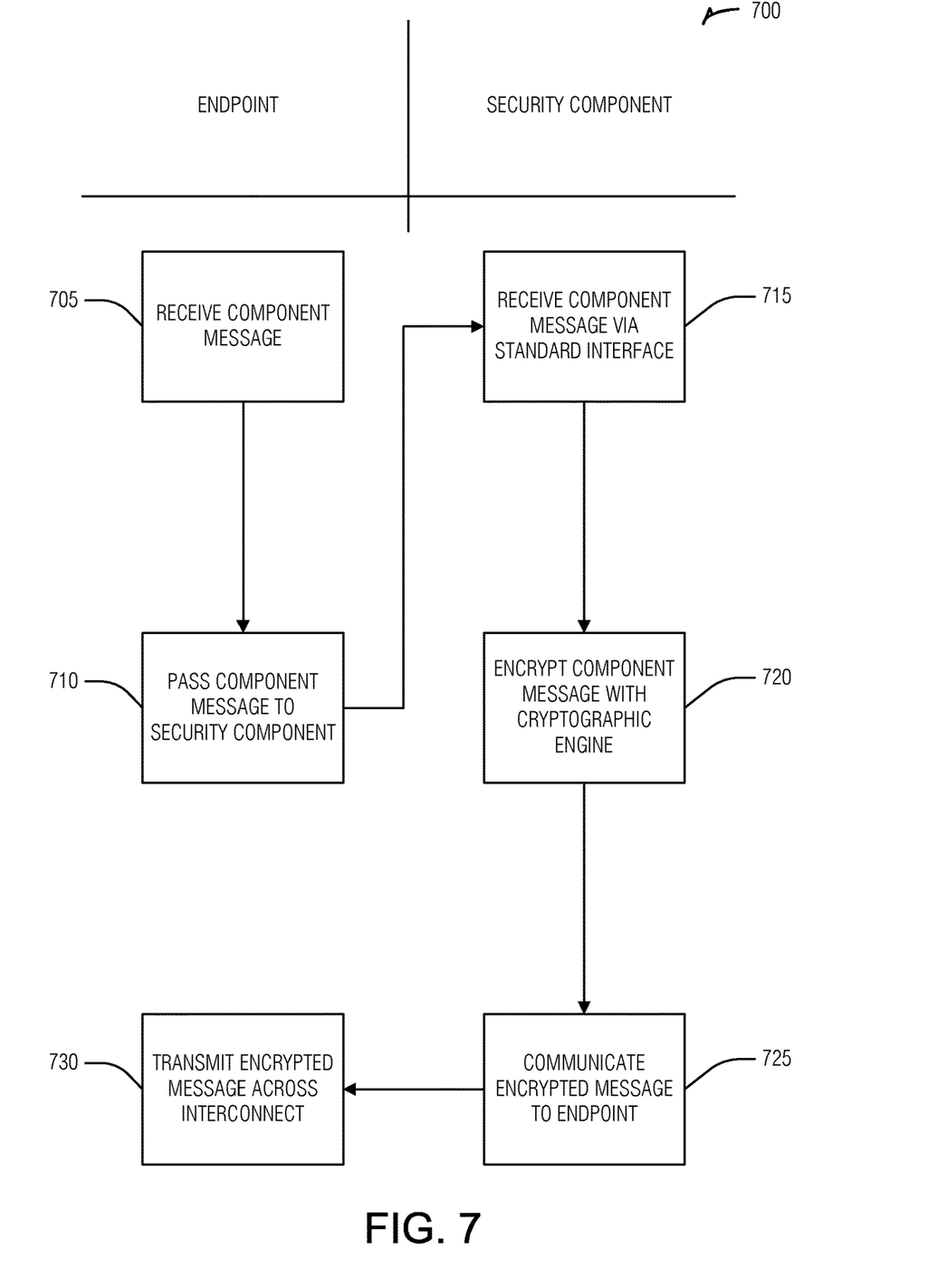
FIG. 7 is a swim lane flowchart illustrating an example of a method for a security plugin for an SoC platform, according to an embodiment.

FIG. 7 is a swim lane flowchart illustrating an example of a method 700 for a security plugin for an SoC platform, according to an embodiment. Operations of the method 700 may be performed by the components listed above with respect to FIG. 1 or 2, or via computer hardware, such as circuit groups, as described below with respect to FIG. 8. Operations 705, 710, and 730 are performed by an interconnect endpoint component of an SoC interconnect and operations 715, 720, and 725 are performed by a security component communicatively coupled to the interconnect endpoint.

At operation 705, a component message may be received from an SoC component (e.g., the initiating component).

At operation 710, the component message may be passed to the security component a security interconnect.

At operation 715, the component message may be received by the security component.

At operation 720, the component message may be secured by the security component. In an example, to be secured, the component message may be encrypted by the security component using a cryptographic engine, which is one of a plurality of cryptographic engines for which the security interconnect is the same. In an example, encrypting the component message may include adding a message integrity element from a message integrity circuit of the security component.

In an example, to secure the component message includes adding the message integrity element from a message integrity circuit of the security component without encrypting the component message data. Operation of the message integrity element may include reading a security header of an interconnect message and using the integrity element to verify the integrity of the message payload. For example, a second secured message may be received over the interconnect by the interconnect endpoint. The endpoint may relay the second encrypted message to the security component to verify the integrity of the message payload using the integrity element and an integrity engine. For example, a cryptographic hash of the payload may be stored in the integrity element. The integrity engine may compute the hash from the payload and compare the hash with that in the integrity element. If the hashes match, the payload was not changed in transit. In an example, the security component may drop the second secured message in response to being unable to verify the integrity of the second encrypted message.

At operation 725, the encrypted message may be communicated to the interconnect endpoint via the security interconnect. In an example, the security component may establish a cryptographic session for a communications between the SoC component and the destination component. In an example, a session key for the cryptographic session is used by the cryptographic engine to encrypt the component message. In an example, the session key corresponds to the communications stream and no other communications stream of the interconnect.

At operation 730, the encrypted message may be transmitted across the interconnect. In an example, every message transmitted from the bus endpoint is encrypted by the security component. In an example, every message traversing a bus to which the bus endpoint is a terminus is encrypted by respective security components in endpoints of the bus. Thus, the entire interconnect consists of secured communications.

The operations illustrated above generally describe a process for outbound messages. A converse process may accept inbound secured messages and unsecure these messages for delivery to an SoC component. For example, a second encrypted message may be received over the interconnect. The message header (e.g., a security header) of the second encrypted message may be read to determine that it is an encrypted message. The encrypted message may be passed from the interconnect endpoint to the security component via the security interconnect. The second encrypted message may then be decrypted by the security component and the component message contents delivered to the endpoint. The endpoint may then transmit the component message contents to the destination SoC component.

In an example, an access controller may operate to enforce SoC component access restrictions. For example, a second component message may be received including an initiator identifier (e.g., SoC component ID) and a destination identifier (e.g., another SoC component ID). The security component may access a security-attributes-of-the-initiators registry to determine that the initiator component does not have access to the destination component based on the initiator identifier and the destination identifier. The security component may then discard the second component message in response to the determination that an initiator component does not have access to a destination component. This process may also work on the receiving end, where the access controller discards received interconnect messages (as opposed to component messages) using the access controller.

Figure 8:
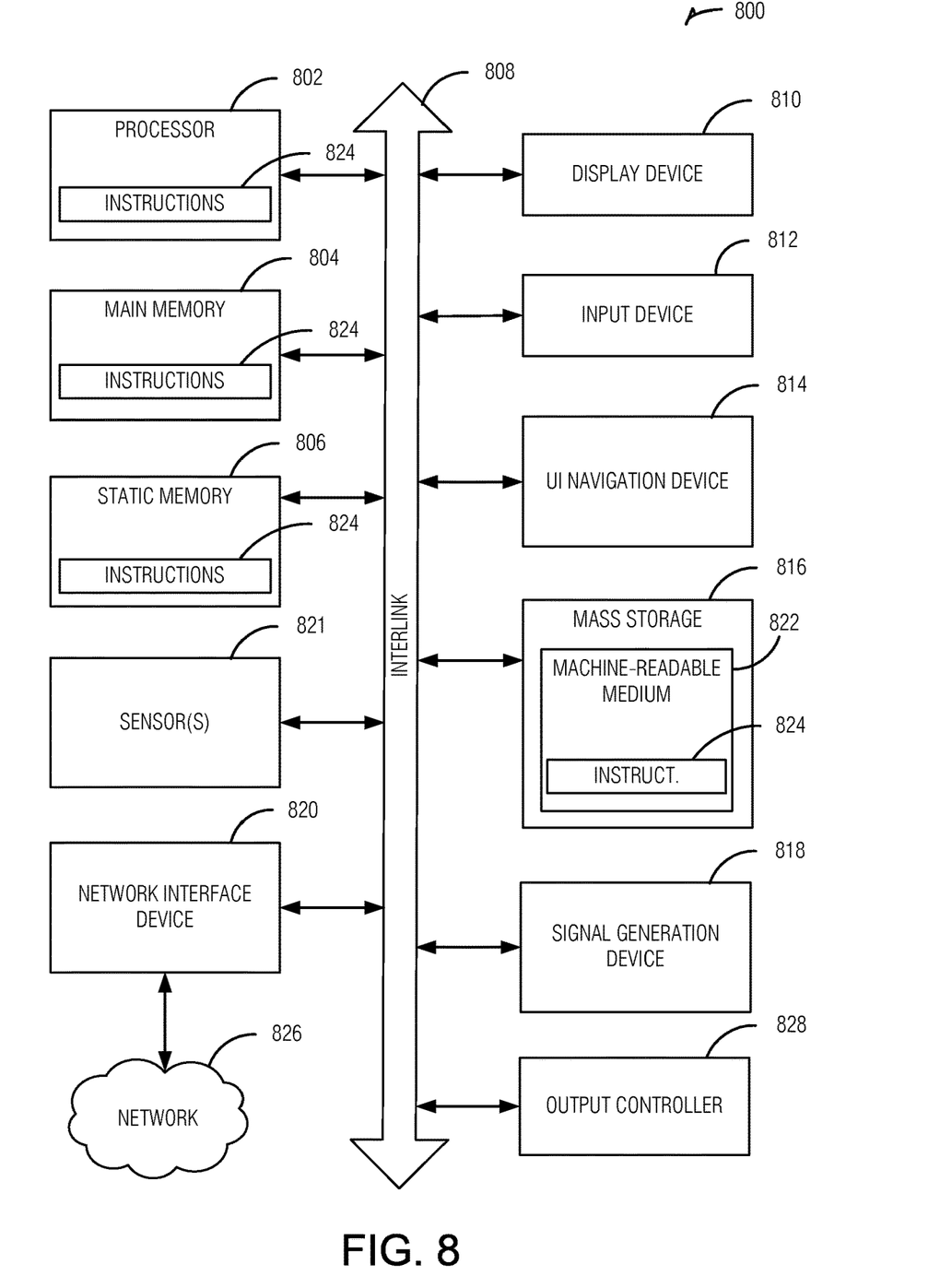
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets (also known as a group of circuits or circuit groups) are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 includes subject matter (such as a device, apparatus, or machine) comprising: a cryptographic circuit including: a cryptographic engine selected from a plurality of cryptographic engines; and a standard interface that is generic to the plurality of cryptographic engines, wherein, in operation, an unencrypted message from an initiator component received by a system-on-a-chip interconnect interface is provided to the cryptographic engine via the standard interface to produce an encrypted message that is transmitted to a destination component; a cryptographic controller to manage a cryptographic key used by the cryptographic engine to create the encrypted message; and a cryptographic state manager to manage cryptographic session states of a cryptographic session between the initiator component and the destination component.

In Example 2, the subject matter of Example 1 may include, wherein the cryptographic circuit includes an integrity engine selected from a plurality of integrity engines, and wherein the standard interface is generic to the plurality of integrity engines.

In Example 3, the subject matter of any one of Examples 1 to 2 may include, wherein the plurality of cryptographic engines includes a set of Advanced Encryption Standard cryptographic engines.

In Example 4, the subject matter of any one of Examples 1 to 3 may include, wherein the plurality of cryptographic engines are classified by at least one of die size, power consumption, cost, throughput performance, or cryptographic performance.

In Example 5, the subject matter of any one of Examples 1 to 4 may include, wherein the cryptographic controller includes at least one of a seed or initialization key.

In Example 6, the subject matter of any one of Examples 1 to 5 may include, wherein the cryptographic controller is to negotiate with a communication peer to obtain a session key.

In Example 7, the subject matter of any one of Examples 1 to 6 may include, wherein the cryptographic controller is to retrieve a session key from a field-programmable component of the system-on-a-chip.

In Example 8, the subject matter of any one of Examples 1 to 7 may include, wherein to manage cryptographic session states between the initiator component and the destination component includes the cryptographic state manager to maintain a data structure of cryptographic sessions, the data structure including fields for a destination component, a sequence number, and a session key.

In Example 9, the subject matter of any one of Examples 1 to 8 may include, wherein the session key is different between different cryptographic sessions.

In Example 10, the subject matter of any of Examples 1 to 9 may include: a security-attributes-of-the-initiators registry to store access rights of the system-on-a-chip components; and a filter to block the message in response to a determination that the initiator component does not have access to the destination component based on the security-attributes-of-the-initiators registry.

In Example 11, the subject matter of any of Examples 1 to 10 may include: determine whether a message received by the interconnect interface from another system-on-a-chip interconnect interface is an encrypted message; relay the message to the cryptographic circuit if the message is an encrypted message; and pass the message through to the interconnect interface if the message is not an encrypted message.

Example 12 includes subject matter (such as a device, apparatus, or machine) comprising: a security block including: a cryptographic circuit including: a cryptographic engine selected from a plurality of cryptographic engines; and a standard interface that is generic to the plurality of cryptographic engines, the standard interface being bi-directional between the cryptographic engine and a requester; a cryptographic controller to manage a cryptographic key used by the cryptographic engine; and a cryptographic state manager to manage cryptographic session states between an initiator component and a destination component; and a system-on-a-chip interconnect endpoint coupled to an interconnect of the system-on-a-chip, the interconnect coupled to a plurality of system-on-a-chip interconnect endpoints, the plurality of system-on-a-chip interconnect endpoints coupled to components of the system-on-a-chip, the system-on-a-chip interconnect interface including: a component facing transceiver to send or receive component messages to components; an interconnect packager to convert a component message received from a component to an interconnect message and to convert the interconnect message received from another interconnect endpoint into a component message; and a security interconnect conforming to the standard interface of the cryptographic circuit of the security block, the security interconnect interposed between communications of the component facing transceiver and the interconnect packager, wherein a component message received by the component facing transceiver is passed to the security circuit via the standard interface to create an encrypted message which is returned via the standard interface to be packaged by the interconnect packager prior to transmission on the interconnect.

In Example 13, the subject matter of Example 12 may include, wherein the interconnect endpoint includes an interconnect header analyzer to determine whether a message received from the interconnect is encrypted and relay the message to the security block if it is encrypted via the security interconnect and by-pass the security interconnect otherwise.

In Example 14, the subject matter of any one of Examples 12 to 13 may include: an access controller to manage access rights of system-on-a-chip components, the access controller a security-attributes-of-the-initiators registry to store access rights of the system-on-a-chip components; and a filter to block the message in response to a determination that the initiator component does not have access to the destination component based on the security-attributes-of-the-initiators registry.

In Example 15, the subject matter of any one of Examples 12 to 14 may include, wherein the cryptographic circuit includes an integrity engine selected from a plurality of integrity engines, and wherein the standard interface is generic to the plurality of integrity engines.

In Example 16, the subject matter of any one of Examples 12 to 15 may include, wherein the plurality of cryptographic engines are classified by at least one of die size, power consumption, cost, throughput performance, or cryptographic performance.

In Example 17, the subject matter of any one of Examples 12 to 16 may include, wherein to manage cryptographic session states between the initiator component and the destination component includes the cryptographic state manager to maintain a data structure of cryptographic sessions, the data structure including fields for a destination component, a sequence number, and a session key.

In Example 18, the subject matter of any one of Examples 12 to 17 may include, wherein the session key is different between different cryptographic sessions.

Example 19 includes subject matter (such as a method, means for performing acts, machine readable medium including instructions that when performed by a machine cause the machine to performs acts, or an apparatus to perform) comprising: receiving a component message at a bus endpoint from a system-on-a-chip component; passing, by the bus endpoint, the component message to a security component via a security interconnect; receiving the component message by the security component via the security interconnect; encrypting the component message using a cryptographic engine, the cryptographic engine being one of a plurality of cryptographic engines, the security interconnect being the same for all of the plurality of cryptographic engines; communicating the encrypted message to the bus endpoint via the security interconnect; and transmitting the encrypted message across the interconnect by the bus endpoint.

In Example 20, the subject matter of Example 19 may include, wherein encrypting the component message includes adding a message integrity element from a message integrity circuit of the security component.

In Example 21, the subject matter of any one of Examples 19 to 20 may include: receiving a second encrypted message over the interconnect; relaying the second encrypted message to the security component to verify the integrity of the second encrypted message; and dropping the second encrypted message in response to being unable to verify the integrity of the second encrypted message.

In Example 22, the subject matter of any one of Examples 19 to 21 may include, wherein the second encrypted message includes an invalid message integrity element.

In Example 23, the subject matter of any one of Examples 19 to 22 may include: receiving a second encrypted message over the interconnect; reading a message header for the second encrypted message to determine that it is encrypted; passing, by the bus endpoint, the second encrypted message to the security component via the security interconnect; decrypting, by the security component, the second encrypted message to create a second component message; and transmitting the second component message to the system-on-a-chip component.

In Example 24, the subject matter of any one of Examples 19 to 23 may include, receiving a second component message including an initiator identifier and a destination identifier; accessing a security-attributes-of-the-initiators registry to determine that an initiator component does not have access to a destination component based on the initiator identifier and the destination identifier; and discarding the second component message in response to the determination that an initiator component does not have access to a destination component.

In Example 25, the subject matter of any one of Examples 19 to 24 may include establishing a cryptographic session for a communications between the system-on-a-chip component and a destination component.

In Example 26, the subject matter of any one of Examples 19 to 25 may include, wherein a session key for the cryptographic session is used by the cryptographic engine to encrypt the component message.

In Example 27, the subject matter of any one of Examples 19 to 26 may include, wherein the session key corresponds to the communications stream and no other communications stream of the interconnect.

In Example 28, the subject matter of any one of Examples 19 to 27 may include, wherein every message transmitted from the bus endpoint is encrypted by the security component.

In Example 29, the subject matter of any one of Examples 19 to 28 may include, wherein every message traversing a bus to which the bus endpoint is a terminus is encrypted by respective security components in endpoints of the bus.

In Example 30, at least one machine readable medium includes instructions that, when executed by a machine, cause the machine to implement any of Examples 19-29.

In Example 31, a system may include means to implement any of Examples 19-29.

Example 32 includes subject matter (such as a device, apparatus, or machine) comprising: means for receiving a component message at a bus endpoint from a system-on-a-chip component; means for passing, by the bus endpoint, the component message to a security component via a security interconnect; means for receiving the component message by the security component via the security interconnect; encrypting the component message using a cryptographic engine, the cryptographic engine being one of a plurality of cryptographic engines, the security interconnect being the same for all of the plurality of cryptographic engines; means for communicating the encrypted message to the bus endpoint via the security interconnect; and means for transmitting the encrypted message across the interconnect by the bus endpoint.

In Example 33, the subject matter of Example 32 may include, wherein encrypting the component message includes adding a message integrity element from a message integrity circuit of the security component.

In Example 34, the subject matter of any one of Examples 32 to 33 may include: means for receiving a second encrypted message over the interconnect; means for relaying the second encrypted message to the security component to verify the integrity of the second encrypted message; and means for dropping the second encrypted message in response to being unable to verify the integrity of the second encrypted message.

In Example 35, the subject matter of any one of Examples 32 to 34 may include, wherein the second encrypted message includes an invalid message integrity element.

In Example 36, the subject matter of any one of Examples 32 to 35 may include: means for receiving a second encrypted message over the interconnect; means for reading a message header for the second encrypted message to determine that it is encrypted; means for passing, by the bus endpoint, the second encrypted message to the security component via the security interconnect; means for decrypting, by the security component, the second encrypted message to create a second component message; and means for transmitting the second component message to the system-on-a-chip component.

In Example 37, the subject matter of any one of Examples 32 to 36 may include: means for receiving a second component message including an initiator identifier and a destination identifier; means for accessing a security-attributes-of-the-initiators registry to determine that an initiator component does not have access to a destination component based on the initiator identifier and the destination identifier; and means for discarding the second component message in response to the determination that an initiator component does not have access to a destination component.

In Example 38, the subject matter of any one of Examples 32 to 37 may include establishing a cryptographic session for a communications between the system-on-a-chip component and a destination component.

In Example 39, the subject matter of any one of Examples 32 to 38 may include, wherein a session key for the cryptographic session is used by the cryptographic engine to encrypt the component message.

In Example 40, the subject matter of any one of Examples 32 to 39 may include, wherein the session key corresponds to the communications stream and no other communications stream of the interconnect.

In Example 41, the subject matter of any one of Examples 32 to 40 may include, wherein every message transmitted from the bus endpoint is encrypted by the security component.

In Example 42, the subject matter of any one of Examples 32 to 41 may include, wherein every message traversing a bus to which the bus endpoint is a terminus is encrypted by respective security components in endpoints of the bus.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A security plugin for a system-on-a-chip platform, the security plugin comprising:
    a cryptographic circuit including:
        a selected cryptographic engine selected from a plurality of cryptographic engines available to designers of the system-on-a-chip, selection of the selected cryptographic engine from the plurality of cryptographic engines based on security or manufacturing goals of the designers and at least one of die size, power consumption, cost, throughput performance, or cryptographic performance of the selected cryptographic engine;
        wherein the cryptographic circuit includes an integrity engine selected from a plurality of integrity engines; and
        a standard interface that is generic to the plurality of cryptographic engines, wherein, in operation, an unencrypted message from an initiator component received by a system-on-a-chip interconnect interface is provided to the selected cryptographic engine via the standard interface to produce an encrypted message that is transmitted to a destination component, the standard interface comprising:
            a messaging bus; and
            a translator corresponding to the selected cryptographic engine, the translator, when in operation, to translate messages of the messaging bus to hardware inputs of each cryptographic engine of the plurality of cryptographic engines, the plurality of cryptographic engines each having a different hardware interface for each respective hardware input, the hardware interfaces defining respective inputs for the plurality of cryptographic engines;
    a cryptographic controller to manage a cryptographic key used by the selected cryptographic engine to create the encrypted message; and
    a cryptographic state manager to manage cryptographic session states of a cryptographic session between the initiator component and the destination component.

2. The security plugin of claim 1, wherein the standard interface is generic to the plurality of integrity engines.

3. The security plugin of claim 1, wherein the plurality of cryptographic engines includes a set of Advanced Encryption Standard cryptographic engines.

4. The security plugin of claim 1, wherein the plurality of cryptographic engines are classified by at least one of die size, power consumption, cost, throughput performance, or cryptographic performance.

5. The security plugin of claim 1, wherein the cryptographic controller is to negotiate with a communication peer to obtain a session key.

6. The security plugin of claim 1, wherein to manage cryptographic session states between the initiator component and the destination component includes the cryptographic state manager to maintain a data structure of cryptographic sessions, the data structure including fields for a destination component, a sequence number, and a session key.

7. The security plugin of claim 1, comprising an access controller to manage access rights of system-on-a-chip components, the access controller including:
    a security-attributes-of-the-initiators registry to store access rights of the system-on-a-chip components; and
    a filter to block the message in response to a determination that the initiator component does not have access to the destination component based on the security-attributes-of-the-initiators registry.

8. The security plugin of claim 1, comprising an interconnect message header analyzer to:
    determine whether a message received by the interconnect interface from another system-on-a-chip interconnect interface is an encrypted message;
    relay the message to the cryptographic circuit if the message is an encrypted message; and
    pass the message through to the interconnect interface if the message is not an encrypted message.

9. A method for a security plugin for a system-on-a-chip, the method comprising:
    receiving a component message at a bus endpoint from a system-on-a-chip component;
    passing, by the bus endpoint, the component message to a security component via a security interconnect;
    receiving the component message by the security component via the security interconnect;
    encrypting the component message using a selected cryptographic engine, the selected cryptographic engine being a selected one of a plurality of cryptographic engines available to designers of the system-on-a-chip, selection of the selected cryptographic engine from the plurality of cryptographic engines being based on security or manufacturing goals of the designers and at least one of die size, power consumption, cost, throughput performance, or cryptographic performance of the selected cryptographic engine, the security interconnect used for each of the plurality of cryptographic engines, the plurality of cryptographic engines each having a different hardware interface for each respective input, the hardware interfaces defining respective inputs for the plurality of cryptographic engines and a plurality of integrity circuits, the encrypting including:

transmitting the component message to the selected cryptographic engine by the security component via a messaging bus;

translating a bus communication from the messaging bus to hardware input accepted by the selected cryptographic engine; and translating an output of the selected cryptographic engine produced in response to the input to a second bus communication including an encrypted message form of the component message;

communicating the encrypted message to the bus endpoint via the security interconnect; and transmitting the encrypted message across the interconnect by the bus endpoint.

10. The method of claim 9, wherein encrypting the component message includes adding a message integrity element from a message integrity circuit of the security component.

11. The method of claim 10 comprising:

receiving a second encrypted message over the interconnect;

relaying the second encrypted message to the security component to verify the integrity of the second encrypted message; and dropping the second encrypted message in response to being unable to verify the integrity of the second encrypted message.

12. The method of claim 9 comprising:

receiving a second encrypted message over the interconnect;

reading a message header for the second encrypted message to determine that it is encrypted;

passing, by the bus endpoint, the second encrypted message to the security component via the security interconnect;

decrypting, by the security component, the second encrypted message to create a second component message; and transmitting the second component message to the system-on-a-chip component.

13. The method of claim 9 comprising:

receiving a second component message including an initiator identifier and a destination identifier;

accessing a security-attributes-of-the-initiators registry to determine that an initiator component does not have access to a destination component based on the initiator identifier and the destination identifier; and discarding the second component message in response to the determination that an initiator component does not have access to a destination component.

14. The method of claim 9 comprising establishing a cryptographic session for a communications between the system-on-a-chip component and a destination component.

15. The method of claim 14, wherein a session key for the cryptographic session is used by the selected cryptographic engine to encrypt the component message, and wherein the session key corresponds to the communications stream and no other communications stream of the interconnect.

16. The method of claim 9, wherein every message traversing a bus to which the bus endpoint is a terminus is encrypted by respective security components in endpoints of the bus.

17. At least one non-transitory machine readable medium including instructions that, when executed by a machine, cause the machine to perform operations for a security plugin for a system-on-a-chip, the operations comprising:

receiving a component message at a bus endpoint from a system-on-a-chip component;

passing, by the bus endpoint, the component message to a security component via a security interconnect;

receiving the component message by the security component via the security interconnect;

encrypting the component message using a selected cryptographic engine, the selected cryptographic engine being a selected one of a plurality of cryptographic engines available to designers of the system-on-a-chip, selection of the selected cryptographic engine from the plurality of cryptographic engines being based on security or manufacturing goals of the designers and at least one of die size, power consumption, cost, throughput performance, or cryptographic performance of the selected cryptographic engine, the security interconnect used for each of the plurality of cryptographic engines, the plurality of cryptographic engines each having a different hardware interface for each respective input, the hardware interfaces defining respective inputs for the plurality of cryptographic engines and a plurality of integrity circuits, the encrypting including:

transmitting the component message to the selected cryptographic engine by the security component via a messaging bus;

translating a bus communication from the messaging bus to hardware input accepted by the selected cryptographic engine; and translating an output of the selected cryptographic engine produced in response to the input to a second bus communication including an encrypted message form of the component message;

communicating the encrypted message to the bus endpoint via the security interconnect; and transmitting the encrypted message across the interconnect by the bus endpoint.

18. The at least one machine readable medium of claim 17, wherein encrypting the component message includes adding a message integrity element from a message integrity circuit of the security component.

19. The at least one machine readable medium of claim 18, wherein the operations comprise:

receiving a second encrypted message over the interconnect;

relaying the second encrypted message to the security component to verify the integrity of the second encrypted message; and dropping the second encrypted message in response to being unable to verify the integrity of the second encrypted message.

20. The at least one machine readable medium of claim 17, wherein the operations comprise:

receiving a second encrypted message over the interconnect;

reading a message header for the second encrypted message to determine that it is encrypted;
passing, by the bus endpoint, the second encrypted message to the security component via the security interconnect;
decrypting, by the security component, the second encrypted message to create a second component message; and
transmitting the second component message to the system-on-a-chip component.

21. The at least one machine readable medium of claim 17, wherein the operations comprise:
receiving a second component message including an initiator identifier and a destination identifier;
accessing a security-attributes-of-the-initiators registry to determine that an initiator component does not have access to a destination component based on the initiator identifier and the destination identifier; and
discarding the second component message in response to the determination that an initiator component does not have access to a destination component.

22. The at least one machine readable medium of claim 17, wherein the operations comprise establishing a cryptographic session for a communications between the system-on-a-chip component and a destination component.

23. The at least one machine readable medium of claim 22, wherein a session key for the cryptographic session is used by the selected cryptographic engine to encrypt the component message, and wherein the session key corresponds to the communications stream and no other communications stream of the interconnect.

24. The at least one machine readable medium of claim 17, wherein every message traversing a bus to which the bus endpoint is a terminus is encrypted by respective security components in endpoints of the bus.

* * * * *

UNITED STATES PATENT AND TRADEMARK OFFICE
CERTIFICATE OF CORRECTION

PATENT NO.        : 10,726,162 B2
APPLICATION NO.   : 14/577812
DATED             : July 28, 2020
INVENTOR(S)       : Sastry et al.

Page 1 of 1

It is certified that error appears in the above-identified patent and that said Letters Patent is hereby corrected as shown below:

On the Title Page

In Column 2, Item (56) under "Foreign Patent Documents", Line 3, after "6/2016", insert
--¶DE 202015009800 3/2020--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*